United States Patent
Foster et al.

(10) Patent No.: US 7,621,238 B2
(45) Date of Patent: Nov. 24, 2009

(54) WATER HEATER AND SYSTEM FOR INSULATING SAME

(75) Inventors: David Foster, Thornapple, MI (US); Richard Courtney, Woodland, MI (US); Ryan Ritsema, Middleville, MI (US)

(73) Assignee: Bradford White Corporation, Ambler, PA (US)

(*) Notice: Subject to any disclaimer, the term of this patent is extended or adjusted under 35 U.S.C. 154(b) by 320 days.

(21) Appl. No.: 11/286,470

(22) Filed: Nov. 23, 2005

(65) Prior Publication Data

US 2007/0113800 A1    May 24, 2007

(51) Int. Cl.
    *F24H 9/02*    (2006.01)
(52) U.S. Cl. ..................... 122/19.2; 264/46.5
(58) Field of Classification Search ............... 122/19.2, 122/494; 264/46.5; 220/592.1, 592.25, 495.01, 220/495.05; 29/890.03, 890.051
    See application file for complete search history.

(56) References Cited

U.S. PATENT DOCUMENTS

| | | | |
|---|---|---|---|
| 2,160,009 A | 5/1939 | Walker | |
| 3,253,731 A | 5/1966 | Fink | |
| 3,347,276 A | 10/1967 | Dunn | |
| 3,446,881 A | 5/1969 | Poole | |
| 3,948,295 A | 4/1976 | Lemont | |
| 4,009,735 A | 3/1977 | Pinsky | |
| 4,039,098 A | 8/1977 | Stilts | |
| 4,240,999 A | 12/1980 | Decker, Jr. | |
| 4,242,387 A | 12/1980 | Ward | |
| 4,269,890 A | 5/1981 | Breitling | |
| 4,372,028 A | 2/1983 | Clark et al. | |
| 4,431,198 A | 2/1984 | Beinhaur | |
| 4,442,585 A | 4/1984 | McGehee | |
| 4,447,377 A * | 5/1984 | Denton | 264/45.2 |
| 4,477,399 A | 10/1984 | Tilton | |
| 4,527,543 A | 7/1985 | Denton | |
| 4,596,682 A | 6/1986 | Mosier | |
| 4,628,184 A | 12/1986 | West | |
| 4,632,792 A | 12/1986 | Clark | |
| 4,640,437 A | 2/1987 | Weingartner | |
| 4,687,118 A | 8/1987 | Clark | |
| 4,744,488 A | 5/1988 | Nelson | |
| 4,749,532 A | 6/1988 | Pfeffer | |
| 4,784,087 A | 11/1988 | Chevaier et al. | |
| 4,790,290 A | 12/1988 | Chevalier et al. | |
| 4,808,356 A * | 2/1989 | West et al. | 264/46.5 |
| 4,817,564 A | 4/1989 | Akkala et al. | |
| 4,830,793 A | 5/1989 | Fermigier | |
| 4,861,968 A * | 8/1989 | West | 392/449 |

(Continued)

FOREIGN PATENT DOCUMENTS

CA    1195910    10/1985

(Continued)

*Primary Examiner*—Gregory A Wilson
(74) *Attorney, Agent, or Firm*—RatnerPrestia (57) ABSTRACT

An article configured to distribute foam insulation between a water tank and an outer shell of a water heater is provided. The article comprises a body portion configured to extend between the water tank and the outer shell of the water heater. The body portion at least partially defines a flow passage for foam insulation. Opposed flap portions extend from an end of the body portion. Means are provided on the flap portions for attaching each of the flap portions to the water tank.

19 Claims, 3 Drawing Sheets

U.S. PATENT DOCUMENTS

| | | | |
|---|---|---|---|
| 4,878,482 A * | 11/1989 | Pfeffer | 122/19.2 |
| 4,890,762 A | 1/1990 | Pfeffer | |
| 4,901,425 A | 2/1990 | Nelson | |
| 4,904,428 A | 2/1990 | West et al. | |
| 4,911,108 A | 3/1990 | Akkala et al. | |
| 4,934,032 A | 6/1990 | Nelson | |
| 4,945,892 A | 8/1990 | Chevalier | |
| 4,951,614 A | 8/1990 | Akkala et al. | |
| 4,952,441 A | 8/1990 | Bose | |
| 4,957,097 A | 9/1990 | Chevalier et al. | |
| 4,958,620 A | 9/1990 | Nelson | |
| 4,962,865 A | 10/1990 | Kakinuma | |
| 4,979,637 A | 12/1990 | Nelson | |
| 4,985,106 A | 1/1991 | Nelson | |
| 4,992,223 A | 2/1991 | Nelson | |
| 4,996,759 A | 3/1991 | Nelson | |
| 4,998,970 A | 3/1991 | Nelson | |
| 5,000,893 A | 3/1991 | West et al. | |
| 5,002,709 A | 3/1991 | Chevalier et al. | |
| 5,005,531 A | 4/1991 | Nelson | |
| 5,020,481 A | 6/1991 | Nelson | |
| 5,023,031 A * | 6/1991 | West et al. | 264/46.5 |
| 5,024,210 A | 6/1991 | Nelson | |
| 5,052,346 A | 10/1991 | Beck | |
| 5,052,347 A | 10/1991 | Nelson | |
| 5,115,767 A | 5/1992 | West | |
| RE33,968 E | 6/1992 | Clark | |
| 5,117,810 A | 6/1992 | Threatt | |
| 5,139,839 A | 8/1992 | Lim | |
| 5,163,119 A | 11/1992 | Windon | |
| 5,208,964 A | 5/1993 | Nelson | |
| 5,209,368 A | 5/1993 | Bradenbaugh | |
| 5,213,728 A * | 5/1993 | Hickman | 264/46.9 |
| 5,229,048 A | 7/1993 | Nelson | |
| 5,251,282 A | 10/1993 | Hanning | |
| 5,263,469 A | 11/1993 | Hickman | |
| 5,293,844 A | 3/1994 | Threatt | |
| 5,353,750 A | 10/1994 | Threatt | |
| 5,358,682 A | 10/1994 | Rogerson | |
| 5,421,475 A * | 6/1995 | Nelson | 220/592.25 |
| 5,460,290 A | 10/1995 | Hanning | |
| 5,474,202 A | 12/1995 | Moore | |
| 5,509,566 A | 4/1996 | Nelson | |
| 5,682,666 A | 11/1997 | Lannes | |
| 5,711,256 A * | 1/1998 | Brandon | 122/19.2 |
| 5,736,211 A | 4/1998 | Fontanilla | |
| 5,761,379 A | 6/1998 | Lannes | |
| 5,868,980 A | 2/1999 | Brandon | |
| 5,899,198 A | 5/1999 | Bradenbaugh | |
| 5,924,392 A | 7/1999 | Hall | |
| 5,979,371 A * | 11/1999 | Lewis | 122/494 |
| 6,029,615 A * | 2/2000 | Terwilliger et al. | 122/494 |
| 6,143,217 A | 11/2000 | Jackson | |
| 6,148,774 A | 11/2000 | Neill | |
| 6,337,052 B1 | 1/2002 | Rosenwasser | |
| 6,885,816 B1* | 4/2005 | Hicks et al. | 392/451 |
| 6,941,899 B2* | 9/2005 | Bradenbaugh | 122/19.2 |
| 2002/0053750 A1 | 5/2002 | Schwaighofer | |
| 2004/0079431 A1 | 4/2004 | Kissell | |
| 2007/0113800 A1* | 5/2007 | Foster et al. | 122/19.2 |

FOREIGN PATENT DOCUMENTS

| | | |
|---|---|---|
| EP | 0320210 | 6/1989 |
| EP | 0797055 | 9/1997 |
| FR | 2595982 | 9/1987 |
| GB | 1466239 | 3/1977 |
| GB | 2178142 | 2/1987 |
| JP | 59214617 | 12/1984 |
| WO | WO 9732160 | 9/1997 |
| WO | WO 0151860 | 7/2001 |

* cited by examiner

WATER HEATER AND SYSTEM FOR INSULATING SAME

TECHNICAL FIELD

The present invention relates to water heaters, and more specifically, to a method and apparatus for insulating water heaters.

BACKGROUND OF THE INVENTION

Conventional water heaters include a water storage tank, a cylindrical outer casing concentrically positioned around the water storage tank, and an annular cavity disposed therebetween. Foam insulation is typically injected into the annular cavity to significantly reduce the escapement of thermal energy from the water storage tank to the surrounding environment. A top cover is fastened to the outer casing thereby substantially enclosing the annular cavity.

For example, U.S. Pat. No. 5,023,031 discloses a method of insulating a water heater with an expandable foam insulating material. The foam is injected into the annular space between the water tank and the outer jacket. The foam is injected into a sleeve, which acts to confine the foam during its most liquid state, positioned within this space.

Also, U.S. Pat. No. 4,861,968 discloses a water heater comprising a water tank having a component intended to be kept substantially free from contact with an expandable foam insulating material. The water heater has a jacket surrounding the tank and providing an insulating space therebetween. Positioned within this space is a pair of flexible sheets forming an apron. The sheets are joined to form a seal protecting the components from contact with the foam. The sheets of the apron are substantially unsealed along the top and a side. Foam is introduced between the sheets of the apron and flows out of the unsealed side of the apron to fill the space between the tank and the jacket.

In U.S. Pat. No. 4,808,356, there is disclosed an apparatus and method of insulating a water heater that utilizes a foaming apron comprised of substantially parallel flexible sheets having an open end and open edges. One sheet is attached to the wall of a water tank and the space between the sheets is open to receive one or more charges of foam forming liquid. Preferably one pouring is performed in conjunction with an open centering template, thereby creating a uniform sealing insulation layer around the water tank. After one charge has solidified sufficiently to maintain the jacket properly centered, the centering template may be removed and one or more further charges of foam forming liquids is introduced.

Despite the foregoing improvements, there is a continuing need to further develop methods and apparatus for insulating water heaters.

SUMMARY OF THE INVENTION

According to an aspect of the invention, an article configured to distribute foam insulation between a water tank and an outer shell of a water heater is provided. The article comprises a body portion configured to extend between the water tank and the outer shell of the water heater. The body portion at least partially defines a flow passage for foam insulation. Opposed flap portions extend from an end of the body portion, and means are provided on the flap portions for attaching each of the flap portions to the water tank.

According to another aspect of the invention, a method of distributing foam insulation between a water tank and an outer shell of a water heater is provided. The method comprises the step of attaching a first flap portion and a second flap portion of a device to the water tank with a body portion of the device disposed between the water tank and the outer shell. The second flap portion of the device is removed from the water tank and foam insulation is delivered into the body portion of the device between the first flap portion and the second flap portion.

According to yet another aspect of the invention, a water heater is provided. The water heater comprises a water tank, an outer shell surrounding the water tank, and a foam distribution device disposed between the water tank and the outer shell, wherein the foam distribution device extends partially around a perimeter of the water tank and to an elevation of the water tank. The water heater further comprises insulation disposed between the water tank and the outer shell and positioned below the elevation of the water tank.

According to still another aspect of the invention, a method of assembling a water heater is provided. The method comprises the step of adhering an insulation member to a bottom end portion of a water tank, and mounting a foam distribution device to the water tank such that it partially extends around a perimeter of the water tank and terminates at an elevation above the insulation member.

BRIEF DESCRIPTION OF THE FIGURES

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

This invention will now be described with reference to several embodiments selected for illustration in the drawings. It will be appreciated that the scope and spirit of the invention are not limited to the illustrated embodiments.

Referring generally to the figures, a water heater 10 comprises a water tank 20, an outer shell (not shown) and a foam insulation device such as an apron 40 configured to distribute foam insulation between the water tank 20 and the outer shell. The apron 40 comprises a body portion extending between the water tank 20 and the outer shell and at least partially defining a flow passage 68 for foam insulation. The apron 40 further comprises opposed flap portions 54, 56 extending from an end of the body portion and means for attaching each of the flap portions 54, 56 to the water tank 20. The opposed flap portions 54, 56 define one or more inlets 64 for foam insulation. Means for attaching flap portions 54, 56 to the water tank 20 comprise, in one embodiment, a plurality of openings 48, 60.

According to an aspect of the invention, an article 40 configured to distribute foam insulation between a water tank 20 and an outer shell of a water heater 10 is provided. The article 40 comprises a body portion configured to extend between the water tank 20 and the outer shell of the water heater 10. The body portion at least partially defines a flow passage 68 for foam insulation. Opposed flap portions 54, 56 extend from an end of the body portion, and means are provided on the flap portions 54, 56 for attaching each of the flap portions 54, 56 to the water tank 20.

According to another aspect of the invention, a method of distributing foam insulation between a water tank 20 and an outer shell of a water heater 10 is provided. The method comprises the step of attaching a first flap portion 56 and a second flap portion 54 of a device 40 to the water tank 20 with a body portion of the device 40 disposed between the water tank 20 and the outer shell. The second flap portion 54 of the device 40 is removed from the water tank 20, and foam insulation is delivered into the body portion of the device 40 between the first flap portion 56 and the second flap portion 54.

According to yet another aspect of the invention, a water heater 10 comprises a water tank 20, an outer shell surrounding the water tank 20, and a foam distribution device 40 disposed between the water tank 20 and the outer shell, wherein the foam distribution device 40 extends partially around a perimeter of the water tank 20 and to an elevation of the water tank. The water heater 10 further comprises an insulation member such as insulation 70 disposed between the water tank 20 and the outer shell and positioned below the elevation of the water tank 20.

According to still another aspect of the invention, a method of assembling a water heater 10 comprises the step of adhering an insulation member 70 to a bottom end portion of the water tank 20. The foam distribution device 40 is mounted to the water tank 20 such that it partially extends around a perimeter of the water tank 20 and terminates at an elevation above the insulation member 70.

Figure 1:
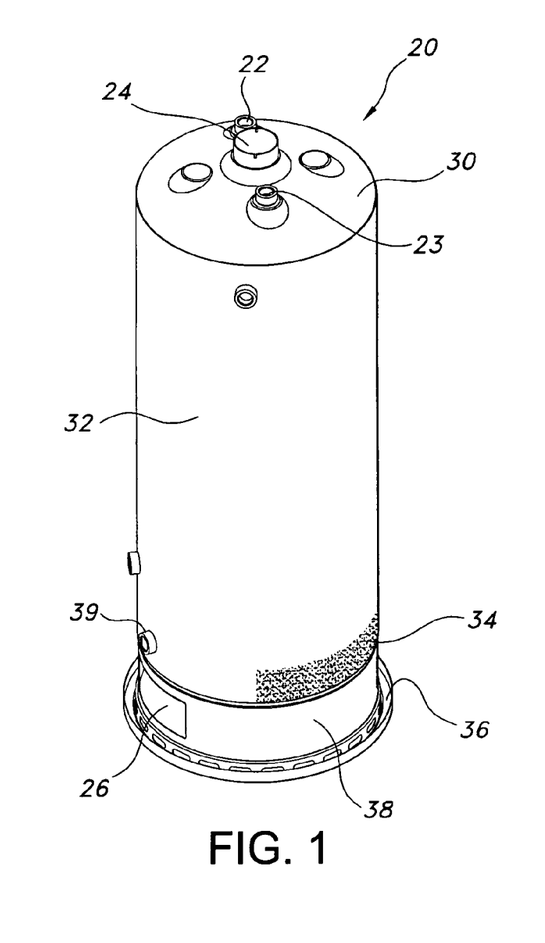
FIG. 1 is a perspective view of an exemplary embodiment of a partially-assembled water heater according to an aspect of this invention.

Referring specifically to FIG. 1, an exemplary embodiment of a water storage tank is designated by the numeral "20." The water storage tank 20 includes a combustion chamber 26 positioned at the bottom end of the water storage tank 20. A flue 24 positioned in the interior of the tank 20 extends along the height of the tank 20. A cold water inlet fitting 22 and a hot water outlet fitting 23 are positioned on the top surface 30 of the water storage tank 20. A drain outlet 39 is positioned on the bottom end portion of the water storage tank 20.

Thermal energy is generated within the combustion chamber 26 for distribution to the contents of the water storage tank 20. The flue 24 is configured to transfer the thermal energy from the combustion chamber 26 to the water contained within the tank 20. Cold water is introduced into the water storage tank 20 through the cold water inlet fitting 22, and hot water is delivered from the tank 20 through hot water outlet fitting 23. The drain outlet 39 is positioned for the discharge of water from the water storage tank 20. More particularly, the drain outlet 39 is positioned at the bottom end portion of the tank 20 to induce the flow of water from the tank 20 by virtue of gravity.

Although not shown, an outer casing or jacket mounts to the trough 36 of the water storage tank 20. The outer casing encapsulates the cylindrical exterior 32 of the tank 20. An annular cavity is disposed between the tank 20 and the outer casing. Foam insulation, also not shown, is injected and distributed throughout the annular cavity and serves to substantially reduce the escapement of thermal energy from the tank 20. The foam insulation may be composed of polyurethane or any other suitable thermally insulating foam material. A top cover (not shown) is fastened to the outer casing, thereby enclosing the top surface 30 of the water storage tank 20. The top cover provides apertures to accommodate the flue 24, cold water inlet fitting 22, and hot water outlet fitting 23. An adhesive 34 is applied to the lower end segment 38 of the chamber 26, the purpose of which will be described in further detail later.

Figure 2:
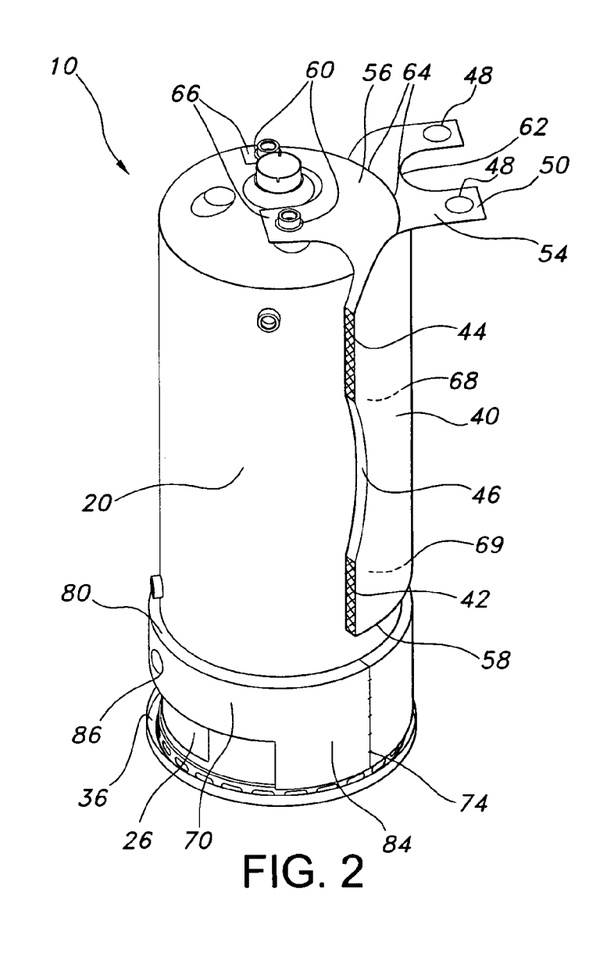
FIG. 2 is a perspective view of an exemplary embodiment of a partially-assembled water heater according to an aspect of this invention, including a foam insulation device and an insulation member.

Referring now to FIG. 2, an exemplary embodiment of a water heater 10 is illustrated. The water heater 10 includes a water storage tank 20, an insulation sheet 70, and a foam distribution device such as apron 40. The apron 40, a portion of which is shown, is positioned in the previously described annular cavity, i.e. between the exterior surface 32 of the water storage tank 20 and the interior surface of the outer casing or jacket (not shown). The apron 40 is configured to deliver and uniformly distribute foam insulation throughout the annular cavity.

The insulation sheet 70, a portion of which is shown, is adhered around the bottom end portion 38 of the water storage tank 20 in the vicinity of the combustion chamber 26 using an adhesive 34 (see FIG. 1) applied to the water storage tank 20. As is illustrated in FIG. 2, the insulation sheet 70 surrounds the base of the water storage tank 20 and the combustion chamber 26 and is positioned beneath the apron 40 such that an annular gap or space remains between the bottom surface of the apron 40 and the top surface of the insulation sheet 70. The insulation sheet 70 prevents the injected foam insulation from entering the combustion chamber 26, as the foam insulation may be flammable or may damage components internal to the combustion chamber 26.

The apron 40 is formed from a single folded sheet, the sides of which are partially adhered together forming a first flap portion 56 and second flap portion 54. The first flap portion 56 includes two primary attachment openings 60 and the second flap portion 54 includes two secondary attachment openings 48. The apron 40 is suspended from the water tank via primary attachment openings 60 which are secured to inlet fitting 22 and outlet fitting 23. The two secondary attachment openings 48 are provided to facilitate the foam insulation distribution process, as explained in further detail later.

As mentioned above, the insulation sheet 70 is adhered to the bottom end portion 38 of the water storage tank 20 using an adhesive 34 (FIG. 1). The adhesive 34 is employed to temporarily adhere the insulation sheet 70 to the bottom end portion 38 of the water storage tank 20 prior to fastening the abutted ends of the insulation sheet 70. A suitable air set adhesive is currently sold and distributed by H.B. Fuller of St. Paul, Minn., USA (Product Number WB-0801). Although the ends of the insulation sheet are shown abutted, the ends may be overlapped and subsequently stapled together.

A number of staples 74 (five shown in FIG. 2) are optionally employed to permanently fasten the abutted ends of the insulation sheet 70. The staples 74 may be any common packaging-type staples applied by a staple gun. A suitable staple is currently sold and distributed by Joseph Kihlberg Company of Trondheim, Norway. A suitable staple gun is also currently sold and distributed by Joseph Kihlberg Company of Trondheim, Norway (Part Number 561-15).

Although five staples 74 are illustrated in FIG. 2, any number of staples or equivalent fasteners may be used to fasten the ends of the insulation sheet 70. It is also envisioned by the inventors that the adhesive 34 may be used to permanently adhere the insulation sheet 70 to the bottom end portion 38 of the water storage tank 20 without the benefit of the staples 74 or other fasteners, or that the adhesive 34 may be eliminated in favor of the staples 74 or other fasteners to fix the insulation sheet 70 at the bottom end portion 38 of the water storage tank 20.

Figure 3:
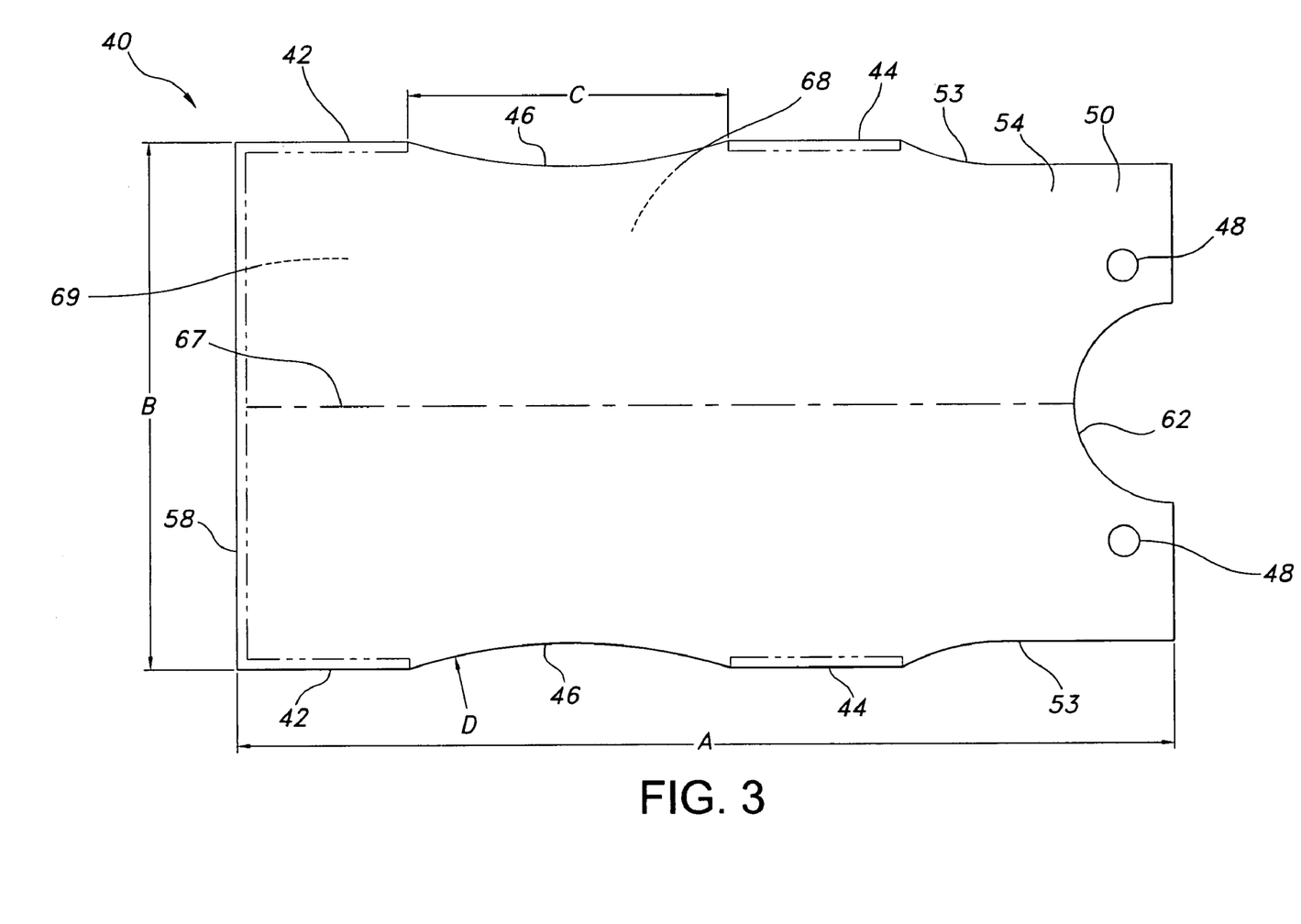
FIG. 3 is a front view of the foam distribution device shown in FIG. 2, illustrated in a flattened form.

Referring now to FIGS. 2 and 3, a front view of one exemplary embodiment of the foam distribution device or apron 40 is illustrated. The foam distribution apron 40 may be formed from a single sheet folded about a bottom edge 58. Accordingly, the apron 40 is substantially rectangular in shape. The apron 40 is bonded or sealed along two side edges (i.e., the side edges extending from the bottom edges to the top edges of the sheet). The folded sheet is then cut at selected edge portions to remove bond areas so that the sides of the sheet can be separated from one another at those selected edge portions. Specifically, cuts are made along the side edges between the lower side regions 42 and the top side regions 44, thereby defining an opening to be described later in further detail. Similarly, cuts are made above the top side regions 44 to the top edges of the sheet, thereby forming the flaps 54, 56 and allowing the flaps 54, 56 to move with respect to one another. The cuts made to the bonded sheet is exaggerated in FIG. 3 and need only be large enough to remove the bonded area in selected edge regions. Alternatively, the apron 40 may be formed from two superimposed materials layers joined together and sealed (such as by a heat sealing process) at the bottom edge 58 and the other aforementioned sealed edges. The apron 40 can be formed in a wide variety of shapes and sizes. As another alternative, selected edge regions can be left unsealed or unbonded.

The bottom edge 58, two lower sealed sides 42, and two top sealed sides 44 encompass the boundaries of the interior body chamber which comprises the flow passage for the foam insulation. The bottom edge 58 and two lower sealed sides 42 encompass the boundaries of a lower interior chamber 69 which collects foam insulation as it is injected into the apron 40, as will be described later in greater detail. The unsealed (or alternatively cut) edges along the apron periphery between the two lower sides 42 and the two top sides 44 define two outlet openings 46. The unsealed (or alternatively cut) material along the apron periphery above the two top sealed edges 44 defines a first flap portion 56 (see FIG. 2) and a second flap portion 54. A foam injection inlet opening 64 (see FIG. 2) is furnished between the first flap portion 56 and the second flap portion 54.

Although not illustrated, it is envisioned that the apron 40 optionally includes a seal or bond along a central axis 67 or at one or more other locations in order to provide plural internal chambers, each having at least one inlet opening to receive foam insulation and at least one outlet to distribute foam insulation into the annular region between the water storage tank and the jacket. Accordingly, although embodiments of the invention selected for illustration in the figures include a single interior body chamber 68 and a single inlet opening 64, it is contemplated that the apron may be provided with multiple chambers and inlets.

Referring still to both FIGS. 2 and 3, the foam distribution apron 40 is configured to receive, collect and distribute foam insulation. More specifically, the foam injection inlet opening 64 furnished between the first flap portion 56 and the second flap portion 54 receives foam insulation in a semi-liquid state. The semi-liquid foam insulation descends through the interior body chambers 68 and into the lower interior chamber 69 which is configured to collect the semi-liquid foam insulation. As the semi-liquid foam insulation reaches a foam state and expands beyond the boundaries of the lower interior chamber 69, the foam expands throughout the interior body chamber 68. The foam insulation eventually expands beyond the boundaries of the interior body chamber 68 and is urged through the two outlet openings 46 and distributed uniformly throughout the annular cavity of the water heater 10.

It has been discovered that advantages are conferred by forming a "trough" at the bottom of the apron 40 in which the semi-liquid foam insulation can collect as it expands and initiates solidification. More specifically, a trough is formed in the area of lower chamber 69 by virtue of the lower sides 42 and the bottom edge 58. This trough collects a pre-determined volume of semi-liquid insulation as it expands and becomes less flowable. It has been discovered that premature delivery of semi-liquid insulation to the annular region within the jacket of the water heater sometimes permits flow of insulation downwardly into the area of the combustion chamber. The insulation member 70 limits or reduces such flow, but the trough formed in the base of the apron helps to reduce such flow by allowing the flowability of the insulation to decrease.

The foam distribution apron 40 is intended to attach and conform to numerous water storage tanks of assorted heights and diameters. In other words, the foam distribution apron is intended to be a "one-size-fits-all" component. The length "A" of the apron 40 is optimally sized to fit the shortest water storage tank and operate efficiently with the tallest water storage tank. Similarly, the width "B" of the apron 40 is optimally sized to wrap around the water storage tank of the smallest circumference without overlapping itself and operate efficiently with the water storage tank of the greatest circumference.

The apron 40 partially extends along the height of the water storage tank 20. The apron 40 attaches to the top of the water storage tank 20 and extends to a distance terminating above the insulation sheet 70 (FIG. 2). The bottom edge 58 of the apron is desirably positioned above top surface 80 (FIG. 2) of the insulation sheet 70. The length of the apron 40 is designated by dimension "A." The length "A" of the apron 40 may be about 38 inches, but may be any other larger or smaller dimension, preferably a dimension selected to ensure that the bottom of the apron terminates above the insulation member 70.

The foam distribution apron 40 partially extends around the perimeter of the water storage tank 20. The width of the apron is designated by dimension "B." The width "B" of the apron 40 may be about 21 inches, but may be any other larger or smaller dimension, preferably a dimension selected to ensure that the width of the apron 40 extends only partially around a perimeter of the water storage tank 20 without overlapping itself.

The length of the outlet openings 46 of apron 40 are designated by dimension "C." The length "C" of the outlet openings 46 may be about 14 inches, but may be any other larger or smaller dimension sufficient to distribute foam insulation throughout the annular cavity of the water heater 10 without compromising the structural integrity of the apron 40. If provided with a radius, the radius or curvature of the outlet openings 46 can be sized to effectively help distribute the foam insulation. The optional radius of the outlet openings 46 is designated by radial dimension "D." The optional radius "D" of the outlet openings 46 may be about 21 inches for example, but may be any other larger or smaller dimension sufficient to help distribute foam insulation throughout the annular cavity of the water heater 10.

Referring still to FIGS. 2 and 3, the primary attachment openings 60 and the secondary attachment openings 48 of the apron 40 are sized to accommodate the outer diameter of the inlet fitting 22 and the outlet fitting 23. The flue opening 62 of the apron 40 is also sized to accommodate the flue 24 (see FIG. 1) of the water heater 10. The flue opening 62 positioned on both flap portions 54 and 56 separates the flap portions 54, 56 into two distinct shoulder segments 50 and 66, respectively. The attachment openings 48 and 60 are positioned on the shoulder segments 50 and 66, respectively.

The apron 40 may be composed or constructed from any material. The apron 40 may be fabricated using a number of processes, such as for example extrusion, co-extrusion, or injection molding. In an exemplary embodiment, the apron 40 is formed from a 1.25 millimeter thick three layer co-extruded film comprised of high molecular weight high density polyethylene, linear low density polyethylene and ultra low density polyethylene. In another exemplary embodiment, the apron 40 is formed from a 1.25 millimeter thick blended film comprised of high molecular weight high density polyethylene and octane linear low polyethylene. Other materials and dimensions are contemplated as well. The apron 40 may be supplied in bulk as perforated sheets on a roll, or alternatively the apron 40 may be supplied individually.

Figure 4:
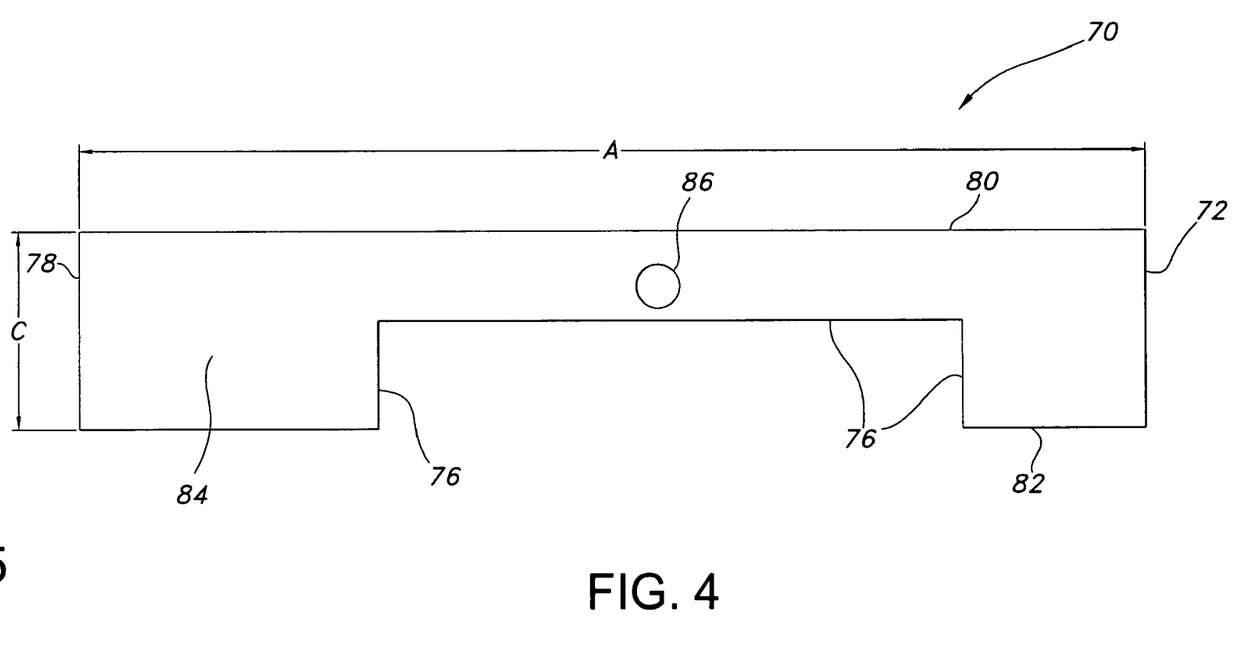
FIG. 4 is a front view of the insulation member shown in FIG. 2, illustrated in a flattened form.
Figure 5:
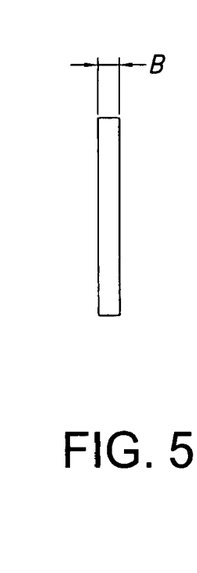
FIG. 5 is a left side view of the insulation member shown in FIG. 4.

Referring now to FIGS. 4 and 5, a front view and corresponding left side view of an exemplary embodiment of the insulation sheet 70 are illustrated. The insulation sheet 70 provides an opening 76 for the water heater combustion chamber opening 26 and opening 86 is provided for the water storage tank drain outlet 39 (FIG. 1). The insulation sheet openings 76 and 86 are appropriately sized to provide sufficient clearance for the combustion chamber opening 26 and the drain outlet 39, respectively.

The insulation sheet 70 is optimally sized to wrap around the entire perimeter of the bottom end portion 38 of the water storage tank 20 so that the ends 72, 78 abut. As described previously, ends 72, 78 are stapled together using staples 74. The width of the insulation sheet 70 is designated by dimension "A." The width "A" of the insulation sheet 70 may be about 69 inches, for example, but may be any other larger or smaller dimension sufficient to wrap around the entire perimeter of a water storage tank to abut or overlap the ends 72, 78.

The insulation sheet 70 substantially prevents the foam insulation from entering the combustion chamber opening 26 and the tank trough 36. The exterior surface 84 of the insulation sheet 70 is optionally compressed by the interior surface of the outer casing (not shown) thereby creating a seal around the bottom end portion 38 of the water storage tank and the combustion chamber 26. The thickness of the insulation sheet 70 is optimally sized to provide a friction contact with the interior surface of the outer casing. The thickness of the insulation sheet 70 is designated by dimension "B." The thickness "B" of the insulation sheet 70 may be about 1 inch, but may be any other larger or smaller dimension sufficient to compress the insulation sheet 70 against the interior surface of an outer casing.

The height of the insulation sheet 70 is designated by dimension "C." The height "C" of the insulation sheet 70 may be about 9 inches, but may be any other larger or smaller dimension, preferably sufficient to prevent the foam insulation from entering the combustion chamber opening 26 and to provide clearance between the top surface 80 of the insulation sheet 70 and the bottom edge 58 of the apron 40.

The insulation sheet 70 may be composed of any insulative, non-flammable, structurally robust material. In an exemplary embodiment, the insulation sheet 70 is composed of RA-22 High-density fiberglass insulation. The insulation sheet 70 may be supplied in a flat form as shown and subsequently formed to conform to the substantially cylindrical bottom end portion 38 (FIG. 1) of the water storage tank 20.

Referring back to FIGS. 1 and 2, the foam injection process comprises multiple stages. In particular, one or both of the flap portions 54, 56 are coupled to the inlet and outlet openings of the water storage tank and hung in place. When preparing to inject insulation, the second flap portion 54 is manually separated from the first flap portion 56 to expose the foam injection inlet opening 64. The second flap portion 54 may be optionally suspended from or draped over the outer casing (not shown) to maintain access to the foam injection inlet opening 64. The foam insulation is injected into the apron 40 in a semi-liquid state through foam injection inlet opening 64.

The foam insulation travels down through the interior body chamber 68 and collects in the lower interior body chamber 69. As the semi-liquid foam insulation reaches a foam state and expands beyond the boundaries of the lower interior chamber 69, the foam amasses and expands throughout the interior body chamber 68. The foam insulation eventually expands beyond the boundaries of the interior body chamber 68 and is urged through the outlet opening 46 and into the annular cavity between the water storage tank 20 and the outer casing (not shown).

The foam insulation initially travels along the perimeter of the top surface 80 of the insulation sheet 70. The foam insulation accumulates along the perimeter of the top surface 80, amasses and rises throughout the annular cavity towards the top surface 30 (FIG. 1). After the foam insulation has ceased expanding and is sufficiently distributed throughout the annular cavity, the second flap portion 54 may be draped over the top surface 30 of the water storage tank 20 or positioned over the inlet and outlet openings prior to enclosing the water heater with a top cover (not shown).

Referring now to FIGS. 1, 2 and 4, the water heater 10 of the exemplary embodiment may be assembled in the following manner, however it should be appreciated that the water heater 10 may be assembled in a variety of different ways and the method is not limited to any particular step or order of steps. An adhesive 34 is applied to the bottom end portion 38 of the water storage tank 20. Prior to placing the insulation sheet 70 to the water storage tank 20 over the adhesive 34, opening 76 of the insulation sheet 70 is aligned with the combustion chamber opening 26 and the outlet drain fitting 39 is inserted into an opening 86 of the insulation sheet 70. The bottom surface 82 (FIG. 4) of the insulation sheet 70 is positioned on the tank trough 36 (FIG. 1) and the insulation sheet 70 is wrapped around the bottom end portion 38 of the tank 20 directly over the layer of adhesive 34. The ends 72 and 78 of the insulation sheet 70 are optionally abutted and fastened together using staples 74.

Following the insulation sheet 70 installation, the outer casing (not shown) is installed over the water storage tank 20 and the insulation sheet 70. The outer casing is fastened to the water storage tank using any sufficient fastening means. The foam distribution apron 40 is then manually inserted into the annular cavity between the water storage tank 20 and the outer casing. The primary attachment openings 60 provided on the first flap portion 56 of the apron 20 are secured over the inlet fitting 22 and the outlet fitting 23 of the water storage tank 20. The secondary attachment openings 48 provided on the second flap portion 54 are subsequently secured over the inlet fitting 22 and the outlet fitting 23, as the second flap portion 54 is positioned above the first flap portion 56.

The water heater may be subsequently stored for a period of time until it is ready to be filled with foam insulation. Prior to filling the annular cavity with foam insulation, the second flap portion 54 of the apron 20 is removed from the water storage tank fittings 22 and 23. The second flap portion 54 is subsequently secured to the outer casing. The foam insulation is injected through the inlet opening 64 of the apron 40 and distributed throughout the annular cavity as described previously. The second flap portion 54 is either removed from the outer casing and draped over the top surface 30 of the water storage tank 20, coupled to the tank's inlet and outlet openings, or optionally permitted to remain secured to the outer casing. A top cover (not shown) is fastened to the outer casing to substantially enclose the water heater 10.

Although the invention is illustrated and described herein with reference to specific embodiments, the invention is not intended to be limited to the details shown. Rather, various modifications may be made in the details within the scope and range of equivalents of the claims and without departing from the spirit of the invention. It will further be appreciated that the drawings are not rendered to any particular proportion or scale. Also, any dimensions referred to in the description of the illustrated embodiments are provided merely for the purpose for illustration. The invention is not limited to any particular dimensions, materials, or other details of the illustrated embodiments.

What is claimed:

1. An article configured to distribute foam insulation between a water tank and an outer shell of a water heater, said article comprising:
    a body portion having a top end, a bottom end opposite the top end and two sides extending between the top end and the bottom end, said body portion configured to extend between the water tank and the outer shell of the water heater, said body portion at least partially defining a flow passage for foam insulation;
    opposed flap portions extending from the top end of said body portion;
    means for attaching at least one of said flap portions to the water tank;
    a trough defined at the bottom end of the body portion for collecting foam insulation, said trough being defined by a closed bottom side at the bottom end of the body portion and closed lower sides, each closed lower side extending from the closed bottom side and along at least a portion of a respective side of the body portion;
    at least one closed top side portion of said body portion extending along a portion of a respective side of the body portion and defined at an elevation above a respective closed lower side; and
    at least one outlet opening extending along a portion of said respective side of the body portion and defined at an elevation between the at least one closed to side portion of said body portion and said respective closed lower side of said respective side of the body portion, wherein, in use, foam is distributed through said outlet opening and into a region defined between the water tank and the outer shell of the water heater.

2. The article of claim 1, wherein said body portion at least partially defines two flow passages for foam insulation.

3. The article of claim 1, wherein said means for attaching each of said flap portions to the water tank comprises an opening positioned on both of said opposed flap portions to engage the water heater.

4. The article of claim 1, wherein said means for attaching each of said flap portions to the water tank comprises a plurality of openings positioned on both of said opposed flap portions to engage the water heater.

5. The article of claim 1, wherein in a separated state said opposed flap portions define a plurality of foam distribution inlets to facilitate uniform distribution of foam between the water tank and the outer shell.

6. A water heater comprising:
    a water tank;
    an outer shell surrounding said water tank;
    a foam distribution device disposed between said water tank and said outer shell, said device extending only partially around a perimeter of said water tank; and
    an insulation member disposed between said water tank and said outer shell and positioned below said foam distribution device such that a gap or a space exists between a bottom external surface of said foam distribution device and a top surface of said insulation member, wherein the gap is sized for receiving foam insulation to thermally insulate an area defined between the bottom external surface of said foam distribution device and the top surface of said insulation member.

7. The water heater of claim 6, wherein said foam distribution device includes means for attaching said foam distribution device to said water tank.

8. The water heater of claim 7, said foam distribution device comprising at least one flap portion, wherein said attaching means is positioned on said flap portion.

9. The water heater of claim 8, wherein said attaching means comprises an aperture positioned on said flap portion to engage a fitting disposed on said water tank.

10. The water heater of claim 8, said foam distribution device comprising opposed flap portions, wherein in a separated state said opposed flap portions define an inlet to receive foam insulation.

11. A method of assembling a water heater comprising the steps of:
    positioning an insulation member at a bottom end portion of a water tank;
    mounting a foam distribution device to the water tank such that it partially extends around a perimeter of the water tank and terminates at an elevation above the insulation member;
    delivering foam insulation into a body portion of the foam distribution device, through an outlet opening defined in the body portion of the foam distribution device extending along a portion of a side of the body portion and defined at an elevation between a closed too side portion defined along the side of the body portion and a closed lower side portion that is also defined along the side of the body portion, and into a gap defined between the water tank and an outer shell of the water heater; and
    attaching a cover to the outer shell of the water heater, thereby substantially enclosing the foam insulation.

12. The method of claim 11 further comprising the step of attaching a flap portion of the foam distribution device to the water tank with a body portion of the device disposed between the water tank and the outer shell.

13. The method of claim 12, said flap portion attaching step further comprising attaching a first flap portion and a second flap portion of the foam distribution device to the water tank.

14. The method of claim 11 further comprising the step of fastening ends of the insulation member together.

15. The method of claim 11 further comprising the step of stapling ends of the insulation member together.

16. The method of claim 11 further comprising the step of adhering the insulation member to the water tank by applying an adhesive to the water tank.

17. A method of assembling a water heater including a water tank positioned above a combustion chamber, said method comprising the steps of:
    positioning an insulation member about the combustion chamber;
    mounting a foam distribution device to the water tank such that it only partially extends around a perimeter of the water tank and terminates at an elevation above the insulation member such that a gap is defined between a closed lower end of the foam distribution device and a top surface of the insulation member that faces the closed lower end of the foam distribution device;

delivering foam insulation into a body portion of the foam distribution device, through an outlet opening defined in the body portion of the foam distribution device and into the gap defined between the closed lower end of the foam distribution device and the top surface of the insulation member; and attaching a cover to an outer shell of the water heater, thereby substantially enclosing the foam insulation.

18. The article of claim 1 further comprising two closed top side portions, each closed top side portion extending along a portion of a respective side of the body portion and defined at an elevation above a respective closed lower side.

19. A water heater comprising:

a water tank;

an outer shell surrounding said water tank;

a foam distribution device disposed between said water tank and said outer shell, said device extending only partially around a perimeter of said water tank, said foam distribution device including:

a body portion having a top end, a bottom end opposite the top end and two sides extending between the top end and the bottom end, said body portion at least partially defining a flow passage for foam insulation;

opposed flap portions extending from the top end of said body portion;

means for attaching at least one of said flap portions to the water tank; and a trough defined at the bottom end of the body portion for collecting foam insulation, said trough being defined by a closed bottom side at the bottom end of the body portion and closed lower sides, each closed lower side extending from the closed bottom side and along at least a portion of a respective side of the body portion; and an insulation member disposed between said water tank and said outer shell, said insulation member positioned below said foam distribution device such that a gap or a space exists between a bottom surface of said foam distribution device and a top surface of said insulation member, wherein the gap is sized to receive foam insulation for thermally insulating an area defined between the bottom surface of said foam distribution device and the too surface of said insulation member.

* * * * *